E. TESSNER.
VALVE FOR PNEUMATIC TIRES.
APPLICATION FILED MAY 13, 1913.
1,114,937.
Patented Oct. 27, 1914.
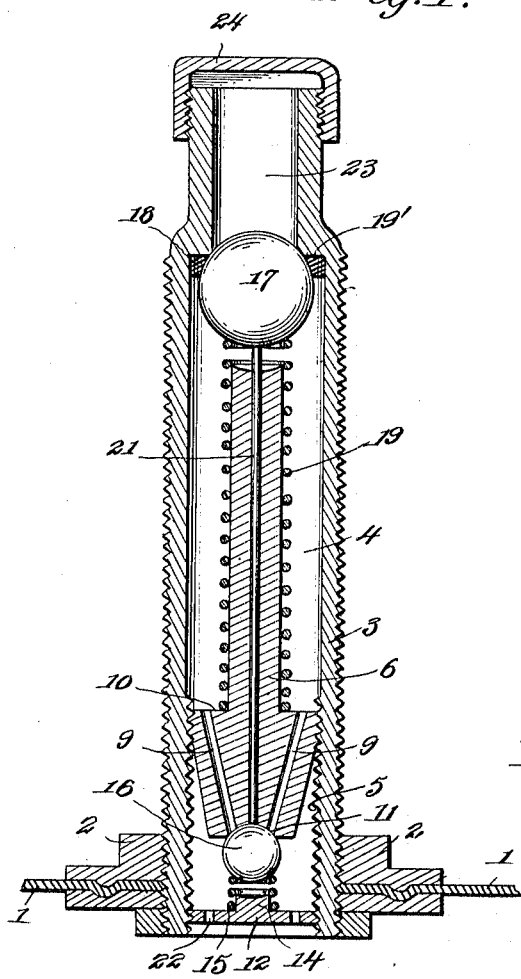
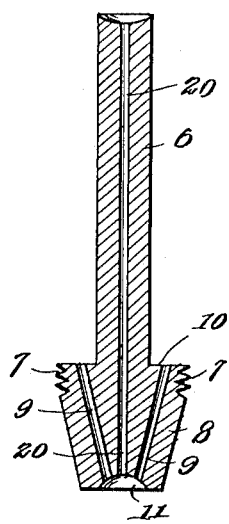
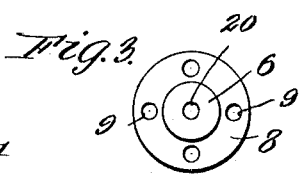
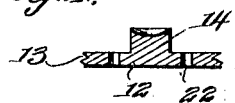
Witnesses
G. M. Spring.
W. E. Valk Jr.
Inventor
Edward Tessner,
By
Richard Owen
his Attorneys

UNITED STATES PATENT OFFICE.

EDWARD TESSNER, OF MILWAUKEE, WISCONSIN.

VALVE FOR PNEUMATIC TIRES.

1,114,937.

Specification of Letters Patent. Patented Oct. 27, 1914.

Application filed May 13, 1913. Serial No. 767,363.

*To all whom it may concern:*

Be it known that I, EDWARD TESSNER, a citizen of the United States, residing at Milwaukee, in the county of Milwaukee and State of Wisconsin, have invented certain new and useful Improvements in Valves for Pneumatic Tires, of which the following is a specification.

This invention relates to inflation valves, and more particularly to a valve adapted for use in connection with pneumatic tires for motor vehicles and the like.

The primary object of the invention is to provide a pneumatic valve wherein efficient means is provided for normally checking or preventing the escape of the compressed air from within the tire, yet permitting the tire to be additionally inflated should occasion demand.

A further object of the invention contemplates the provision of automatic means including a pair of spring pressed ball-valves adapted to be arranged within the casing of the device for normally closing the mouth of the said casing against air escaping from within the tire, the balls being mounted in such a novel and peculiar manner as to readily permit the in-forced air to pass through the valve casing and into the tire in connection with which or to which the valve is attached.

A still further object of the invention resides in the provision of a specially constructed vertically adjustable valve stem arranged within the interior of the valve casing to provide a valve seat for one of the ball-valves, and to form a support to hold the other of the ball-valves in engagement with a second valve seat provided therefor, thus doubly insuring the retention of the air within the tire under normal conditions.

The above and additional objects are accomplished by such means as are illustrated in their preferred embodiment in the accompanying drawings, described in the following specification and then more particularly pointed out in the appended claims forming a part of this application.

In describing the invention in detail, reference will be had to the accompanying drawings, wherein like characters denote like or corresponding parts throughout the several views and in which:

Figure 1 is an enlarged vertical sectional view of a pneumatic valve constructed in accordance with my invention; Fig. 2 is a detail vertical sectional view of the valve stem; Fig. 3 is a top plan view of the said stem; and Fig. 4 is a sectional view of the adjustable plate forming a part of the invention.

Referring now to the drawings, wherein is illustrated the preferred form of my invention, the numeral 1 designates the tire to which the valve is attached through the medium of suitable retaining blocks 2 of the ordinary type, the valve comprising an exteriorly screw threaded casing 3 having a vertically extending bore or opening 4 formed therein within which the valve mechanism is arranged. The lower extremity of the bore or opening 4 is interiorly threaded as at 5 for adjustably supporting a specially constructed valve stem 6, the latter being exteriorly threaded as at 7 to permit vertical adjustment of the said stem within the said casing. A head or enlargement 8 is formed integrally with and at the lower extremity of the valve stem 6, the said head being provided with the exteriorly threaded portion 7 above mentioned, from which point the enlargement converges or tapers toward its lower end for the purpose of spacing the outer wall thereof away from the inner wall of the casing 3 within which it is arranged.

Air ports or passage ways 9 are formed within the enlargement 8 of the stem and extend from shoulders 10 formed by the said enlargement to a concaved valve seat 11 formed concentrically within the lower extremity or end of the stem, the ports or passage ways opening communication between the upper portion of the opening 4 and the lower interiorly threaded portion within which a suitable plate member 12 is adjustably mounted by means of a threaded periphery 13. A centrally disposed upwardly projecting stud or enlargement 14 is formed integrally with the plate member 12 over which an expansion spring 15 is arranged, the said spring 15 normally forcing a ball-valve 16 into the valve seat 11 for closing the passage ways 9 of the valves 10 and preventing the air contained within the lower portion of the valve casing 3, from entering the upper portion thereof. A second and larger ball-valve 17 is normally forced against or into engagement with a rubber ring 18 through the medium of an expansion spring 19 arranged over the stem 6 of the valve, the upper extremity of the said spring engaging the ball for normally supporting the same against the said ring 18, the latter being supported against upward vertical movement by means of shoulders 19' formed within the casing 3 near its upper extremity. The said stem 6 is provided with a centrally disposed vertically extending opening 20 within which a rod 21 is slidably mounted, one end of the rod engaging the ball-valve 16 and its opposite or upper end engaging the ball 17, this arrangement simultaneously moving one ball according to the movement of the other.

Openings 22 are formed within the plate member 12 for opening communication between the lower portion of the casing 3 in the interior of the tire 1 in connection with which the valve is employed thereby producing a continuous air passage between the mouth 23 of the valve casing, and the interior of the tire for in-forced air, as the two ball-valves are supported or retained within their respective valve seats by means of springs 15 and 19, both of which are compressed during the inflation of the tire. A cap 24 may be arranged over the mouth of the casing 22 for normally closing the said valve and preventing dust and other foreign matter entering into the interior mechanism thereof.

Having described fully the structure of the pneumatic valve, the operation or movement of the parts during actual application will now be fully set forth. The in-forced air as it comes into engagement with the larger ball-valve 17 forces the said ball downwardly, compressing the spring 19 and moving the vertically extending rod 21, which in turn forces the smaller ball-valve 16 out of engagement with the valve seat 11, thus creating a continuous air passage from the mouth to the lower portion of the valve opening or bore 4 where the air is free to pass on into the interior of the tire to the openings 22 of the plate member. As the pressure of the inwardly forced air is withdrawn from the ball-valve 17, the springs 15 and 19 respectively return the said balls 16 and 17 into engagement with the valve seats provided therefor, thus effectually closing the air passage way and checking or preventing the escape of the compressed air from the interior of the tire.

It will be seen from the above, taken in connection with the accompanying drawings that the two ball-valves are moved simultaneously, this being accomplished by the provision of the vertically extending rod 21; that the said valves are both yieldably supported by the expansion springs 15 and 19 thus permitting the balls to move downwardly for opening the passage way during the inflation of the tire; and that vertical adjustment of both the plate 12 and the stem 6 is permitted for increasing or decreasing the tension of the said springs upon the ball-valves should occasion demand.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent is:

1. A valve including a valve casing having a valve seat formed therein, a valve stem having a valve seat formed therein, and a pair of valve members disposed for yieldable engagement with the said seats, the said members adapted to be actuated simultaneously, as and for the purpose set forth.

2. A pneumatic valve including a valve casing having a valve seat formed therein, a vertically adjustable valve stem, a valve seat formed within the said stem, a yieldably supported ball-valve disposed for engagement with the said first mentioned valve seat, a yieldably supported ball-valve disposed for engagement with the said second mentioned valve seat, and means engaging the said two ball-valves for simultaneously actuating the same, as and for the purpose set forth.

3. A valve including an outer casing, an adjustable valve stem arranged therein, and a pair of spring pressed ball-valves disposed within the said casing, one of said valves engaging a valve seat formed within the said stem, the other engaging a valve seat formed within the said casing.

4. A valve including an outer casing, having a vertically extending bore, the lower extremity of which is interiorly threaded, a vertically adjustable valve stem arranged within the said casing, the said stem being threaded within the said bore, a head formed integrally with the said stem, the said head having air passage ways formed therein, and a pair of spring pressed ball-valves disposed within the said casing, one of the said valves engaging a valve seat formed within the said stem for closing said passage ways and the other ball-valve engaging a valve seat formed within said casing.

5. An inflation valve including an outer casing, a vertically adjustable valve stem arranged within the said casing, a head formed integrally with the said stem, the said head being exteriorly threaded to engage the interior threaded portion of the said casing and having air passage ways extending therethrough, an adjustable perforated plate member arranged adjacent the said head, and a pair of ball-valves arranged within the said casing, one of the said valves engaging a valve seat formed within the said head for closing the air passages and the other valve engaging a valve seat formed within the said casing.

6. An inflation valve including an outer casing, a vertically adjustable valve stem arranged within the said casing, a vertically adjustable perforated plate member arranged within the said casing beneath the said valve stem, a spring pressed ball-valve supported by the said plate member and adapted to engage the valve seat formed within the said stem, a spring pressed ball-valve supported by the said stem adapted to engage a valve seat formed within the said casing, and a rod extending vertically through the said stem for operating the two valves simultaneously.

7. An inflation valve including an outer casing, a vertically adjustable valve stem arranged within the said casing, a head formed integrally with the said stem at the lower end thereof, the said head having air passage ways extending therethrough, a vertically adjustable perforated plate member arranged within the said casing beneath the said head, a spring pressed ball-valve carried by the said plate member adapted to normally engage a valve seat formed within the said head for closing the said passage ways, a second spring pressed ball-valve supported by the said stem, the said second mentioned ball-valve adapted to normally engage a valve seat formed within the said casing, and means including a vertically extending rod slidably mounted within and extending through the said stem for simultaneously moving the said ball-valve, as and for the purpose set forth.

8. An inflation valve including an outer casing, the said casing having an interiorly threaded vertically extending bore, a valve stem arranged within the said casing, a head formed integrally with and upon the lower extremity of the said stem, the said head being exteriorly threaded for adjusting the said stem throughout the length of the said interiorly threaded bore, a vertically adjustable perforated plate member threaded within the said bore beneath the said head, an expansion spring carried by the said plate member, a ball-valve supported by the said spring for normally forcing the former into engagement with the valve seat formed within the said head for normally closing air passage ways arranged within the said head, a second expansion spring supported by the said valve stem, a second ball-valve supported by the said spring the said spring normally forcing the said valve into engagement with a valve seat formed within the said casing, and means including a rod extending vertically through the said stem and engaging the said ball-valves for simultaneously moving the same for opening and closing air communication from the said casing.

In testimony whereof I affix my signature in presence of two witnesses.

EDWARD TESSNER.

Witnesses:
WALTER C. STEINMETZ,
CHRIST. STEINMETZ.